(12) United States Patent
Dunko

(10) Patent No.: US 7,536,201 B2
(45) Date of Patent: May 19, 2009

(54) MOTION SENSOR CHARACTER GENERATION FOR MOBILE DEVICE

(75) Inventor: Gregory Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 426 days.

(21) Appl. No.: 11/277,797

(22) Filed: Mar. 29, 2006

(65) Prior Publication Data

US 2007/0230747 A1 Oct. 4, 2007

(51) Int. Cl.
*H04M 1/00* (2006.01)
*G06K 7/00* (2006.01)

(52) U.S. Cl. ............... 455/556.1; 455/550.1; 455/41.2; 455/41.3; 455/557; 235/440; 235/439; 235/462.45; 235/472.01

(58) Field of Classification Search .............. 455/556.1, 455/466, 550.1, 553.1, 566, 41.2, 41.3, 557
See application file for complete search history.

(56) References Cited

U.S. PATENT DOCUMENTS

| | | | |
|---|---|---|---|
| 5,515,488 A * | 5/1996 | Hoppe et al. ................ | 345/440 |
| 5,598,187 A | 1/1997 | Ide et al. | |
| 6,252,942 B1 * | 6/2001 | Zoiss et al. .................... | 379/21 |
| 6,487,421 B2 * | 11/2002 | Hess et al. ............... | 455/550.1 |
| 6,633,282 B1 | 10/2003 | Monroe | |
| 7,363,029 B2 * | 4/2008 | Othmer ................... | 455/550.1 |
| 2003/0234772 A1 * | 12/2003 | Zhang et al. ................. | 345/177 |
| 2004/0109608 A1 * | 6/2004 | Love et al. .................. | 382/224 |
| 2004/0203411 A1 * | 10/2004 | Holz auf der Heide et al. ......... | 455/66.1 |
| 2005/0020303 A1 * | 1/2005 | Chan ....................... | 455/556.1 |
| 2005/0107126 A1 * | 5/2005 | Kim .......................... | 455/565 |
| 2005/0116045 A1 | 6/2005 | Chang | |
| 2006/0030289 A1 * | 2/2006 | Liguori et al. .............. | 455/344 |
| 2006/0095474 A1 * | 5/2006 | Mitra et al. ............... | 707/104.1 |

FOREIGN PATENT DOCUMENTS

DE 102004008254 9/2005

(Continued)

OTHER PUBLICATIONS

Sony Ericsson Mobile Communications AB, International Search Report, corresponding to International Patent Application No. PCT/US2006/060246 dated Mar. 6, 2008.
Sony Ericsson Mobile Communications AB, Written Opinion, corresponding to International Patent Application No. PCT/US2006/060246 dated Mar. 6, 2008.

(Continued)

*Primary Examiner*—Huy Q Phan
(74) *Attorney, Agent, or Firm*—Frederick D. Bailey; Moore & Van Allen, PLLC

(57) ABSTRACT

There is disclosed is a mobile device for detecting, tracking, and translating motion into an image that can be rendered on a mobile device display. A motion sensor contained within the mobile device and coupled with a processor can detect and track motion in a two-dimensional plane. A motion selector button is disposed on the housing of the mobile device and coupled with the processor. The motion selector button actuates and de-actuates the motion sensor such that motion is only detected and motion data forwarded to the processor while the motion selector button is actuated. The mobile device further includes a display for rendering an image corresponding to the detected motion. The processor translates the captured motion data into a scaled two-dimensional image that is completely rendered on the mobile device display.

23 Claims, 6 Drawing Sheets

FOREIGN PATENT DOCUMENTS

| | | |
|---|---|---|
| EP | 1441279 | 7/2004 |
| EP | 1457863 | 9/2004 |
| GB | 2329300 | 3/1999 |
| WO | 03001340 | 1/2003 |
| WO | 03040731 | 5/2003 |

OTHER PUBLICATIONS

International Preliminary Report on Patentability, corresponding to International Patent Application No. PCT/US2006/060246, dated Jul. 18, 2008.

* cited by examiner

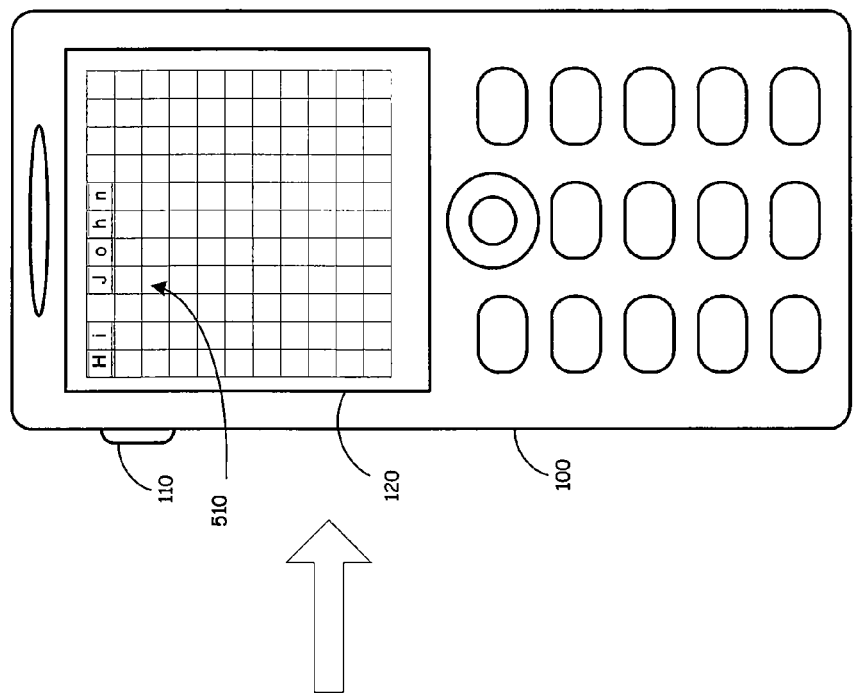
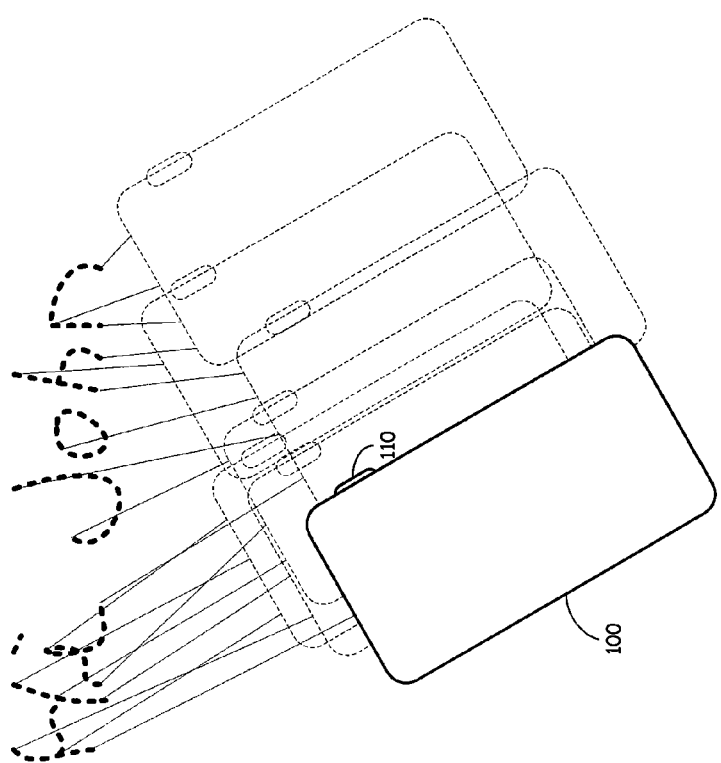
FIGURE 5

MOTION SENSOR CHARACTER GENERATION FOR MOBILE DEVICE

BACKGROUND OF THE INVENTION

The present invention relates to portable mobile communications devices and systems, and more particularly to a portable mobile communications device, system and method that can create and recognize characters based on the motion of the mobile device.

A number of mobile devices are equipped with motion sensing capabilities in the form of accelerometers and/or gyroscopes. Typical reasons for their inclusion include support for gaming applications, enhanced menu navigation/selection, or sports/fitness applications (e.g. pedometer), etc.. Another potential and novel use for an embedded motion sensor within a mobile device is to render motion tracked as a graphical image. The mobile device can be thought of as a writing instrument using the motion sensors to trace a character or image. However, one obstacle to overcome is the ability to determine intentional motion from unintentional motion.

What is needed is a means for rendering an image on the mobile device display based on tracking the intended motion of the mobile device.

BRIEF SUMMARY OF THE INVENTION

According to one embodiment of the invention there is disclosed is a mobile device for detecting, tracking, and translating motion into an image that can be rendered on a mobile device display. A motion sensor contained within the mobile device and coupled with a processor can detect and track motion in a two-dimensional plane. A motion selector button is disposed on the housing of the mobile device and coupled with the processor. The motion selector button actuates and de-actuates the motion sensor such that motion is only detected and motion data forwarded to the processor while the motion selector button is actuated. The mobile device further includes a display for rendering an image corresponding to the detected motion. The processor translates the captured motion data into a scaled two-dimensional image that is completely rendered on the mobile device display.

Images can also be applied to a character recognition process to aid in textual input for a variety of other applications. The mobile device further includes a stored set of reference characters and character recognition means executable by the processor for determining whether the scaled two-dimensional image substantially matches a character contained in the stored set of reference characters.

The images rendered on the mobile device display are two-dimensional. The processor determines the two-dimensional plane of motion tracked by the motion sensor to be parallel to the face of the mobile device. The processor continuously re-determines the two-dimensional plane of motion tracked by the motion sensor to adjust for unintended subtle changes in the orientation of the mobile device. Motion having a component in a third-dimension perpendicular to the plane parallel to the face of the mobile device is ignored when translating the captured motion data into a scaled two-dimensional image that is completely rendered on the mobile device display.

However, motion having a component in a third-dimension perpendicular to the plane parallel to the face of the mobile device can be representative of non-character input including a space, a carriage return, or an end of character delineation. Detected rapid changes in the orientation of the face of the mobile device caused by a sudden twisting motion can be used to manipulate the scaled two-dimensional image. A sudden twisting motion can manipulate the scaled two-dimensional image by changing the default width of a line stroke thereby making the image bolder.

The motion sensor can be an accelerometer or a gyroscopic device.

According to another embodiment of the invention there is disclosed is an accessory for a mobile device that can detect, track, and translate motion into an image that can be transmitted to and rendered on a mobile device display. A motion sensor contained within the accessory and coupled with a processor can detect and track motion in a two-dimensional plane. A motion selector button is disposed on the housing of the accessory and coupled with the processor. The motion selector button actuates and de-actuates the motion sensor such that motion is only detected and motion data forwarded to the processor while the motion selector button is actuated. The processor can translate the captured motion data into a scaled two-dimensional image that is transmitted to and rendered on a mobile device display.

Images can also be applied to a character recognition process to aid in textual input for a variety of other applications. The accessory can further include a stored set of reference characters and character recognition means executable by the processor for determining whether the scaled two-dimensional image substantially matches a character contained in the stored set of reference characters.

The processor determines the two-dimensional plane of motion tracked by the motion sensor to be perpendicular to the longitudinal axis of the accessory. The processor continuously re-determines the two-dimensional plane of motion tracked by the motion sensor to adjust for unintended subtle changes in the orientation of the accessory. Motion having a component in a third-dimension along the longitudinal axis of the accessory is ignored when translating the captured motion data into a scaled two-dimensional image.

However, motion having a component along the longitudinal axis of the accessory can be representative of non-character input including a space, a carriage return, or an end of character delineation. Detected rapid changes in the orientation of the face of the mobile device caused by a sudden tilting motion can be used to manipulate the scaled two-dimensional image. A sudden tilting motion can manipulate the scaled two-dimensional image by changing the default width of a line stroke thereby making the image bolder.

BRIEF DESCRIPTION OF THE DRAWINGS

FIG. 5 illustrates an example that shows the mobile device being moved around to form an image in character recognition mode.

DETAILED DESCRIPTION OF THE INVENTION

The present invention coordinates motion sensors or motion sensing capabilities with a software application that manages the rendering of images on the mobile device display. The present invention further utilizes a motion selection button that can be easily toggled during operation. The motion selection button provides a mechanism that identifies intentional and unintentional motion. Only intentional motion is captured and rendered on the mobile device display. Unintentional motion is ignored. Motion is considered intentional so long as the user actuates the motion selector button.

The present invention can be broken down into two main components. The first component involves the capturing of motion using the motion sensors and the rendering of a graphic corresponding to the sensed motion on the mobile device display. The second component involves manipulating the captured and rendered graphic using a software application.

There are many potential uses for the captured graphic(s). For instance, the captured graphic(s) can be used as input into a messaging system such as short messaging service (SMS), multi-media messaging service (MMS), instant messaging (IM), or e-mail. Moreover, the captured graphic can be operated on by a character recognition program to convert the freestyle motion input into a recognized alpha-numeric character. Such a feature would allow for the composition of text messages simply by 'writing' them by hand and having the input converted to recognized characters. This would provide an alternative to text message composition using the mobile device keypad.

Other characters can be recognized as well. For instance, Chinese characters can be rendered even if the mobile device does not recognize Chinese characters. The software can also be coded to recognize subtle orientation changes like a twist to the left or the right as an indication to make the stroke bolder.

The following detailed description of embodiments refers to the accompanying drawings, which illustrate specific embodiments of the invention. Other embodiments having different structures and operations do not depart from the scope of the present invention.

Figure 1:
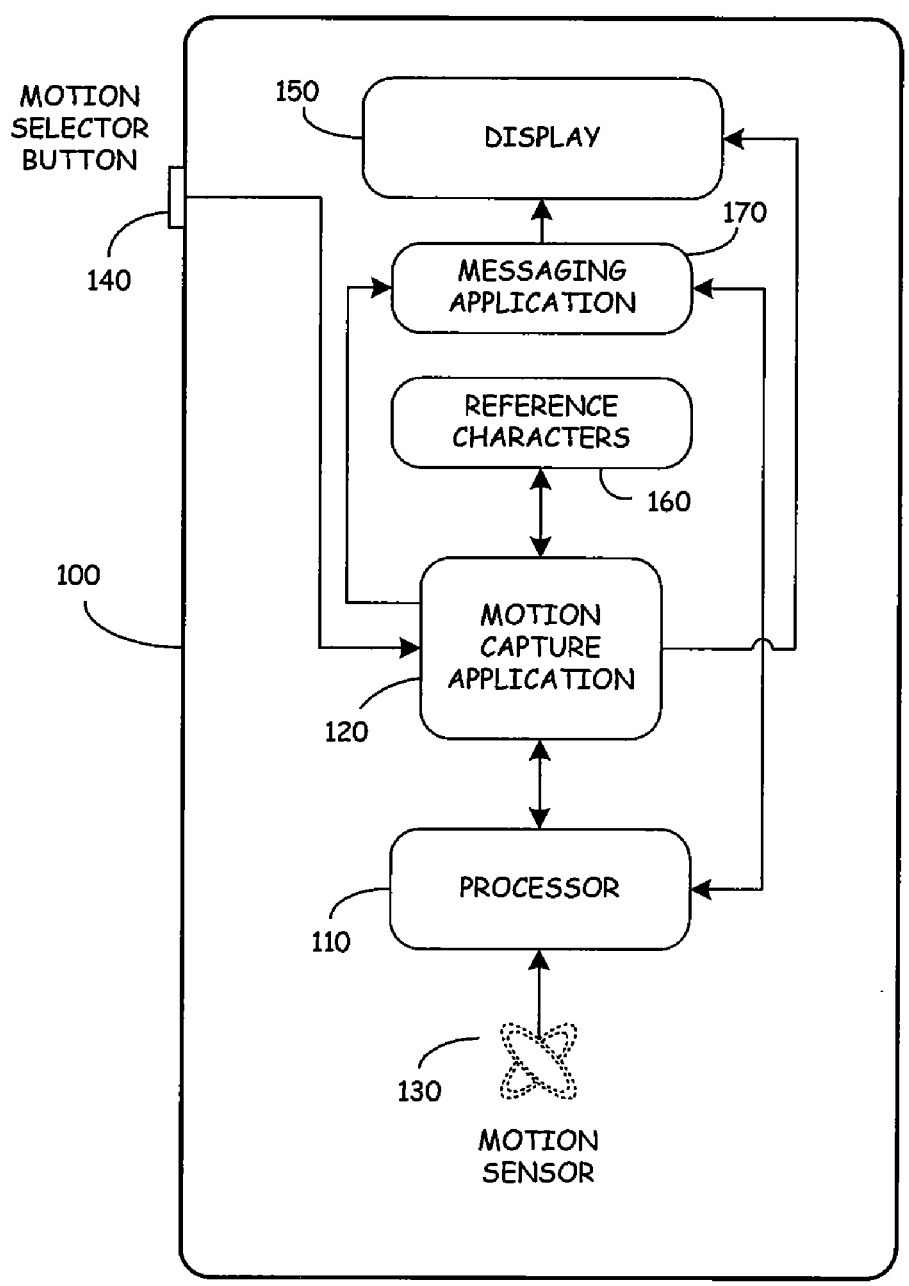
FIG. 1 is a block diagram of an exemplary portable mobile communications device according to an embodiment of the present invention.

FIG. 1 is a block diagram of an exemplary mobile device 100 according to an embodiment of the present invention. The components illustrated in FIG. 1 do not form a complete mobile device 100. Rather, only those components applicable to the present invention are shown and described. Some of the components listed are re-used by other applications within the mobile device 100 or to perform additional functions.

The mobile device includes a processor 110 that is responsible for receiving and processing data pertaining to motion detection and a motion capture application 120. Motion detection is achieved via an internal motion sensor 130 that is coupled with the processor 110. The motion sensor can have multiple functions within the mobile device 100. For purposes of the present invention, the motion sensor 130 can be toggled between an active and inactive state by the motion capture application 120. The mechanism used to toggle the motion sensor between an active and an inactive state is a motion selector button 140 that is coupled with the processor 110 via the motion capture application 120. The motion selector button 140 is actuated when the user physically presses and holds the motion selector button 140 down. This signals the motion capture application 120 to cause the processor to capture and process positional data as determined by the motion sensor 130. The captured positional data can be tracked and plotted to form a two-dimensional graphical image. The two-dimensional graphical image can then be rendered on the display 150 of the mobile device 100.

The motion capture application 130 can be operated in two basic modes. The first mode is a straight forward image capture mode in which the tracked motion is scaled and rendered on the mobile device display 150 exactly as it was captured. The rendered image can then be saved as a graphical file in any number of standard image file formats including, but not limited to, a jpeg file, a gif file, a bitmap file, etc. The scaling may be determined, for example, by determining the maximum deviation in the X and Y directions of the two-dimensional plane defined for a particular character and then normalizing the captured motion within the X by Y frame.

The second mode of operation adds a character recognition feature. If operated in this mode, the captured image is compared to a stored set of reference characters 160 in hopes of finding a match. If a match is found, the stored reference character is displayed on the mobile device rather than the captured image. This mode is especially useful when the user wants to draft a message. Once the motion capture character input is complete, the matching reference characters are used as input to a messaging application 170. The set of reference characters can include, but is not limited to, the ASCII set of characters, Chinese characters, Japanese characters, Greek letters, other common symbols such as mathematical operators or parentheses, etc.

Figure 2:
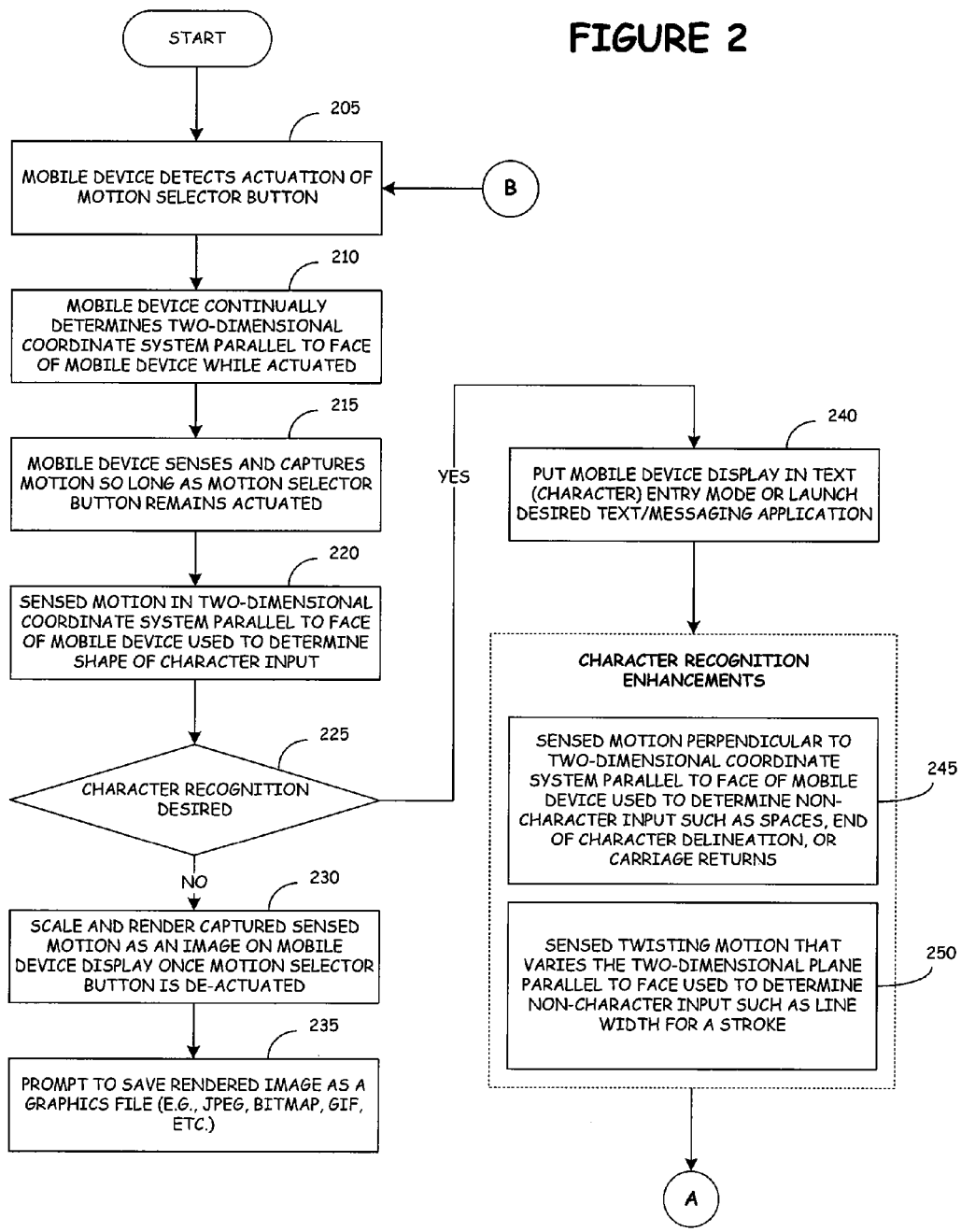
FIG. 2 is a flowchart describing the motion capture process for creating graphical images.

FIG. 2 is a flowchart describing the motion capture process for creating graphical images. The first step is to detect when the motion selector button has been actuated 205. Once the motion selector button is actuated, the mobile device orients itself by determining a two dimensional coordinate system 210 that is, for example, parallel to the face of the mobile device. This orientation occurs somewhat continuously to adjust for subtle but unintentional changes in orientation caused by the user. For tracking and image creation purposes, only two-dimensional renderings are created. Actuation of the motion selector button indicates that motion of the mobile device is to be sensed and tracked until the motion selector button is released 215. Alternatively, the motion selector button can be pressed once to indicate start tracking and again to indicate stop tracking. This alternative would not require the user to hold the motion selector button down while desired motion is tracked. Actuation of the motion selector button causes the motion capture application to execute in conjunction with the processor and the motion sensor(s).

The sensed, tracked, and captured motion is processed in the two-dimensional coordinate system previously determined to indicate the shape of the character input 220. The two-dimensional coordinate system allows for an image rendition while ignoring perpendicular fluctuations in the tracked motion. For instance, the user may be tracing a character freestyle with the mobile device held in his hand. The user only intends a two dimensional-image parallel to the face of the mobile device but may inadvertently cause a change in the third (perpendicular) coordinate axis while tracing the intended character. The perpendicular component of the tracked motion is simply ignored when processing the input. The result is a rendition of the tracing on the mobile device display in the intended two-dimensional plane.

There are two general types of intended input. The first is freestyle drawing and the second is character generation. Thus, there is a step 225 to determine which type of input is currently desired by the user. If the user desires freestyle input then the traced image is captured in two-dimensions as previously described exactly how the user traced the image. The trace data is processed so as to scale the image to fit within the constraints of the mobile device display so that it can be rendered on the mobile device display in its entirety 230. For instance, a user can use large broad gestures to create an image that would far exceed the size of the mobile device display. In such a case the tracked motion would be proportionally scaled down to a size that would fit within the mobile device display. Once sized for the mobile device display, the motion capture application can further process the captured image and/or provide it as input to an image enhancement application for further processing. Further processing can include, but is not limited to, changing line or stroke widths to be bolder or thinner, filling in enclosed areas created by the image with various colors or shadings, making the lines or strokes that define the image into various types of dashed or dotted lines, and allowing for text editing into the image to create a caption or the like. Once the image has been captured, and edited if desired, the mobile device can be instructed to save the image 235 in any number of standard or proprietary image formats. JPEG, GIF, TIF and Bitmap file formats are just a few of many file formats that can be used.

If the user has selected character recognition mode, then the motion capture application prepares the mobile device display for text or character entry mode 240. Character recognition mode is intended to provide an alternative means of input for other mobile device text or messaging functions. Text and messaging functions include, but are not limited to, short messaging service (SMS), multi-media messaging service (MMS), instant messaging (IM), e-mail, data entry for contacts, data entry for mobile device profile settings, etc. Typically, the text and messaging utilize the keypad for data entry. The keypad can be difficult to maneuver due to its rather small size. Thus, an alternative mechanism for text or character entry may be desired.

In addition to previously described mechanisms for translating sensed and tracked motion into a rendered image, character recognition mode provides for additional enhancements. For instance motion in the direction perpendicular to the plane parallel to the face was previously ignored as unwanted. In character recognition mode, sudden not so subtle changes in this direction can be treated as intentional and assigned a specific meaning 245. For instance, this motion can be interpreted as non-character input such as spaces, end of character delineation, or carriage returns. Another type of motion that can be sensed is an intentional twisting motion 250 that exceeds a pre-determined threshold. Similar to the perpendicular motion described above, an intentional twist left (or right) can be assigned a specific non-character input such as those above or can even be used to vary the line width (boldness) of the most recent stroke.

Figure 3:
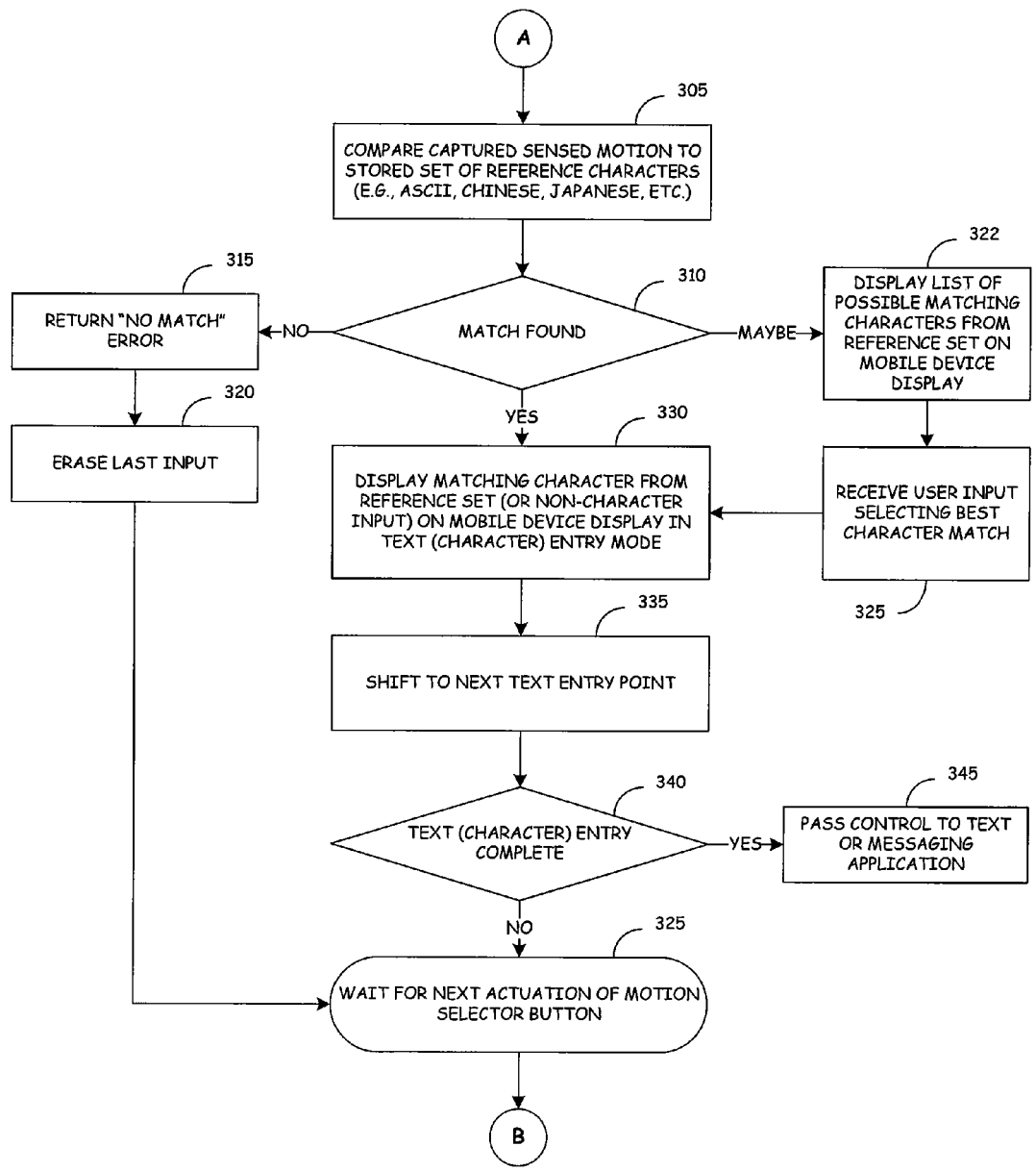
FIG. 3 is a flowchart further describing post capture processing pertaining to character recognition.

FIG. 3 is a flowchart further describing post capture processing pertaining to character recognition. Once a character has been motion sensed, tracked, and traced between actuations of the motion selector button, the character is compared against a stored set of reference characters 305. Different types of reference characters have been previously described herein. If a satisfactory match is not found 310 then a "No Match" error (or the like) can be displayed 315. The previous input can then be erased 320 and the motion capture application will await the next actuation of the motion selector button 325 so that a new character can be input.

Sometimes more than one satisfactory match can be found. Many letters and numbers resemble one another. For instance, the letter "l" and the number "1" can be mistaken for one another. So too can the number "0" and the letter "o". In such cases, the character recognition processing can display a list of possible matching characters from the reference set 322 on the mobile device display. The user can then select 325 which one of the matching possibilities was intended. The mobile device will then display the selected matching character from the set of reference characters 330.

If a match is found 310 then the mobile device will display the matching character from the set of reference characters 330. Similarly if non-character input described above has been recognized it will be displayed by the mobile device or processed to affect the current display of the mobile device. Once the character is displayed or non-character input has been processed, the mobile device will shift to the next text (character) entry point 335. The mobile device can prompt the user to determine if text or character entry is complete 340. If more text or character entry is desired then the motion capture application will await the next actuation of the motion selector button 325 so that a new character can be input.

If text or character entry is complete then the mobile device can pass control over to an appropriate text or messaging application 345 that will use the motion sensed and recognized characters as input. The launched application can now operate on the data as per its own functions.

Figure 4:
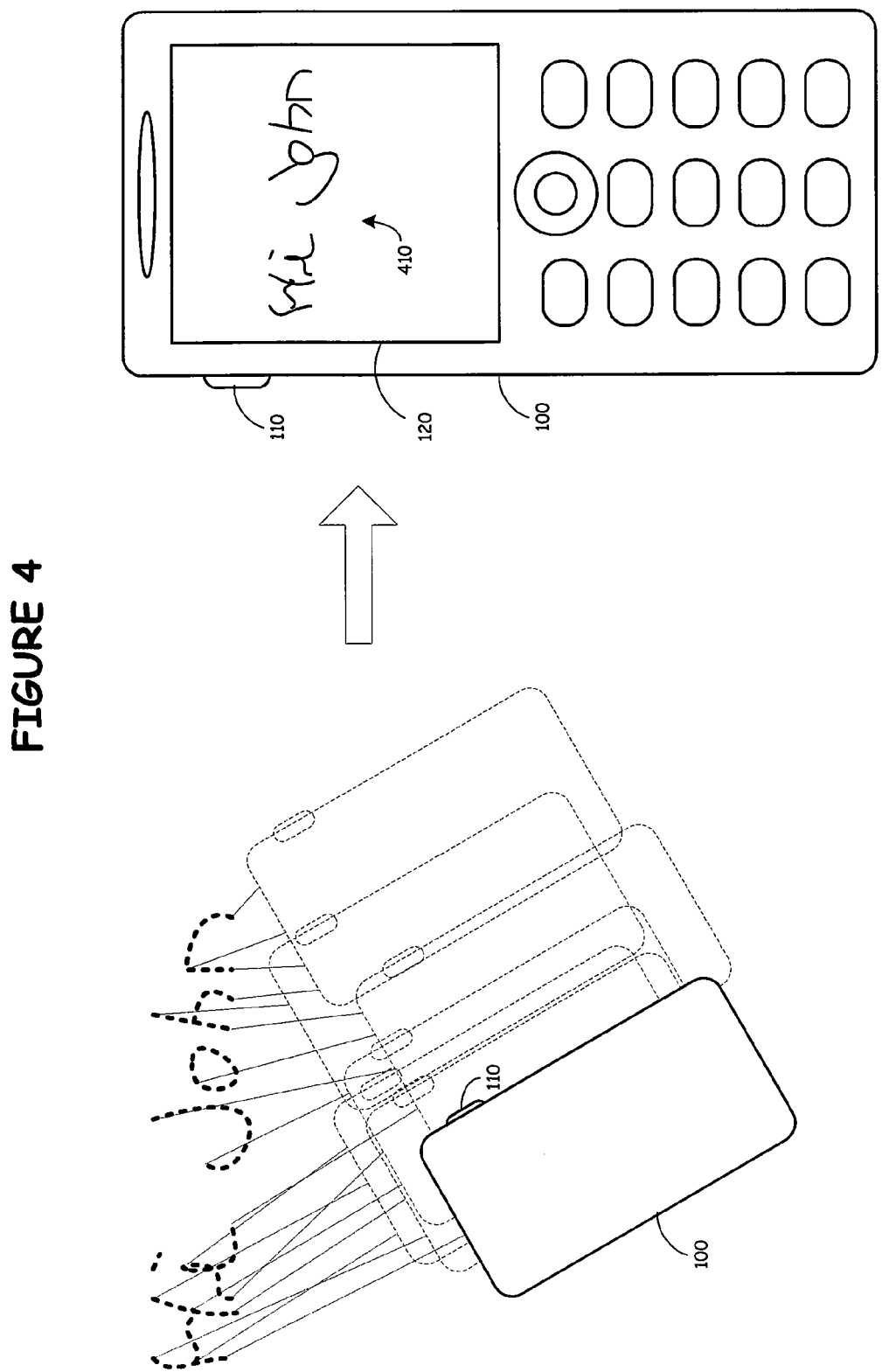
FIG. 4 illustrates an example that shows the mobile device being moved around to form an image in freestyle drawing mode.

FIG. 4 illustrates an example that shows the mobile device being moved around to form an image in freestyle drawing mode. A mobile device 100 is shown having a motion selector button 110 disposed in the upper right portion of the mobile device 100. The placement and location of the motion selector button 110 on the mobile device 100 is illustrative and is subject to design choice. On the left, the mobile device 100 is shown in various positions intended to illustrate the tracking of motion. Specifically, the tracked motion traces out the words "Hi John". The right side of FIG. 4 illustrates a rendering 410 of the sensed and tracked motion after it has been scaled to fit the mobile device display 120.

Scaling a free form image involves a two step process. First, the motion capture application needs to be informed of the intended start and stop points of the motion tracking input session. The motion capture application should also be aware of sub-sessions in which to start and stop motion tracking. One way to accomplish this is to use the motion selector button 110 differently for a whole input session and an input sub-session. For instance, double clicking the motion selector button 110 (as one would a computer mouse) can indicate the beginning of an input session. This informs the motion capture application to be ready for input. Actual free-form input can then be accepted between single clicks of the motion selector button 110 or during periods when the motion selector button 110 is held down. The user will double click the motion selector button 110 again to indicate that the entire session is complete.

Only after the entire session is complete will the motion capture application scale the captured motion of the sub-sessions. This is the second part of the process. Scaling can be accomplished by apportioning an equal amount of screen space for each sub-session. The user can also select whether the rendered image should be displayed in a portrait or landscape perspective. The user can further specify whether the sub-session input should be presented in a top to bottom format or a left to right format. In addition, the user can be given the ability to move each sub-session image rendering to another location within the display similar to re-arranging the pieces of a puzzle.

FIG. 5 illustrates an example that shows the mobile device being moved around to form an image in character recognition mode. On the left, the mobile device 100 is shown in various positions intended to illustrate the tracking of motion. Specifically, the tracked motion traces out the words "Hi John". The right side of FIG. 5 illustrates a rendering 510 of the sensed and tracked motion after it has been processed in character recognition mode. Each character has been recognized and input into a reserved grid space on the mobile device display 120. Upon completion of text or character entry, the user can launch any one of a number of resident messaging or text applications that can use the recognized characters as input.

The motion capture application can also be implemented as a feature within the text or messaging applications. In this implementation, the user can first launch a text or messaging application and select "motion capture" as the mechanism of input.

Figure 6:
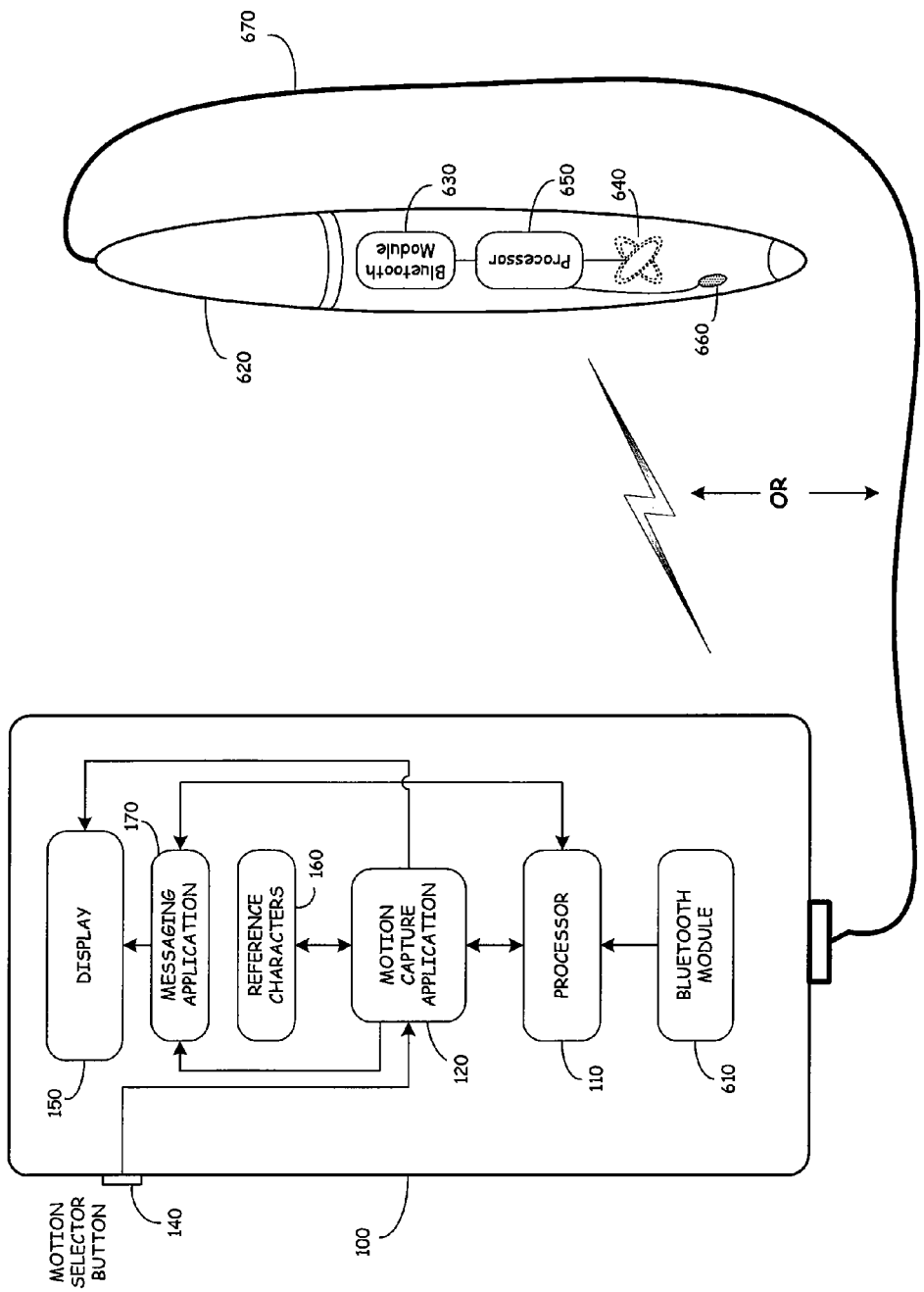
FIG. 6 is a block diagram of an exemplary portable mobile communications device and companion accessory according to an embodiment of the present invention.

FIG. 6 is a block diagram of an exemplary portable mobile communications device and companion elongated accessory according to an embodiment of the present invention. Up until now, the description has focused on having the motion sensor co-located within the mobile device 100. Another alternative is to provide an accessory 620 to the mobile device 100 that contains the motion sensor 640. The mobile device 100 and the motion sensor accessory 620 can be made communicable via a short range wireless RF link such as Bluetooth™. This embodiment is similar to the description and processing of described in FIGS. 1-5. In this case, a Bluetooth™ module 610 is included within the mobile device 100. A second Bluetooth™ module 630 is included within the motion sensor accessory 620 making the two devices communicable with one another when successfully paired. The motion sensor accessory 620 further includes a processor 650 coupled with the motion sensor 640 and the Bluetooth™ module 630. A motion selector button 660 is also included.

The motion sensor accessory 620 will typically be elongated and can be shaped in the form of a pen. The motion selector button 660 can be placed anywhere on the housing of the motion sensor accessory 620. For purposes of illustration, the motion selector button 660 is shown on the lower portion of the motion sensor accessory 620. In this location it can be more easily and naturally actuated by the user. Once paired with the mobile device 100 and actuated, the motion sensor accessory 620 will operate as previously described with respect to collecting and forwarding data pertaining to two-dimensional tracked motion. This time the two-dimensional plane of interest will be perpendicular to the longitudinal axis of the motion sensor accessory 620.

Collected data will be forwarded to the mobile device via the respective Bluetooth™ modules on a real-time basis. The motion sensor accessory 620 can also be set to a character recognition mode in which the motion sensor accessory 620 performs all of the processing necessary to match the input to a character in a set of stored characters. While not specifically illustrated, a database of reference characters can be included within the motion sensor accessory 620. In this mode, the motion sensor accessory 620 will forward recognized characters to the mobile device 100 via the respective Bluetooth™ modules 610, 630. This input can be applied directly to a text or messaging application running on the mobile device 100.

The accessory 620 to the mobile device 100 that contains the motion sensor 640 can also be implemented using a wired cable connection such as USB, RS232, or the like 670. In this instance, the accessory 620 would contain the motion sensor 640 and all data it generates would be passed directly to the mobile device 100 directly for processing. The accessory 620 would not need to include a Bluetooth™ module since the data would be passed over the cable 670.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A mobile device for detecting, tracking, and translating motion into an image that can be rendered on a mobile device display comprising:
    a processor;
    a motion sensor contained with the mobile device and coupled with the processor, the motion sensor capable for detecting and tracking motion in two-dimensional plane;
    a motion selector button disposed on the housing of the mobile device and coupled with the processor, the motion selector button for actuating and de-actuating the motion sensor such that motion is only detected and motion data forwarded to the processor only while the motion selector button is actuated; and
    a display for a rendering an image corresponding to the detected motion, wherein the processor translates the captured motion data into a scale two-dimensional image that is completely rendered on the mobile device display,
    wherein the processor determines the two-dimensional plane of motion tracked by the motion sensor to be parallel to the face of the mobile device and the processor continuously re-determines the two-dimensional plane of motion tracked by the motion sensor to adjust for unintended subtle changes in the orientation of the mobile device, detecting a rapid change in the orientation of the face of the mobile device caused by an intentional twisting motion being used to manipulate the scaled two-demensional image, a sudden twisting motion manipulating the scaled two-dimensional image by changing the default width of a line stroke thereby making part of the image bolder.

2. The mobile device of claim 1 further comprising: a stored set of reference characters; and character recognition means executable by the processor for determining whether the scaled two-dimensional image substantially matches a character contained in the stored set of reference characters.

3. The mobile device of claim 1 wherein motion having a component in a third-dimension perpendicular to the plane parallel to the face of the mobile device is ignored when translating the captured motion data into a scaled two-dimensional image that is completely rendered on the mobile device display.

4. The mobile device of claim 1 wherein motion having a component in a third-dimension perpendicular to the plane parallel to the face of the mobile device is representative of non-character input.

5. The mobile device of claim 4 wherein non-character input can include any of a space, a carriage return, or an end of character delineation.

6. The mobile device of claim 1 wherein a first double clicking of the motion selector button actuates the motion sensor and indicates the beginning of a free-form input session.

7. The mobile device of claim 6 wherein free-form input being captured between at least one of single clicks of the motion selector button or while the motion selector button is held down.

8. The mobile device of claim 7 wherein the free-form input session ending upon a second double clicking of the motion selector button.

9. The mobile device of claim 1 wherein the motion sensor is comprised of an accelerometer.

10. The mobile device of claim 1 wherein the motion sensor is comprised of a gyroscopic device.

11. An elongated accessory for a mobile device that can detect and track motion and forward motion data to the mobile device for further processing, the accessory comprising:
    a processor;
    a wireless RF module;
    a motion sensor contained within the accessory and coupled with the processor, the motion sensor capable of detecting, tracking, and capturing motion in a two-dimensional plane; and
    a motion selector button disposed on the housing of the accessory and coupled with the processor, the motion selector button for actuating and de-actuating the motion sensor such that motion is only detected and motion data forwarded to the processor only while the motiom selector button is actuated; wherein the processor causes the wireless RF module to transmit the captured motiom data, wherein the processor determines the two-dimensional plane of motion tracked by the motion sensor to be perpindicular to the longitudinal axis of the elongated accessory and the processor continuously re-determines the two-dimensional plane of motion tracked by the motion sensor to adjust for unintended subtle changes in the orientation of the accessory, detecting a rapid change in the orientation of the longitudinal axis of the elongated accessory caused by an intentional tilting motion being used to manipulate the scaled two-dimensional image, a sudden tilting motion manipulating the scaled two-dimensional image by changing the default width of a line stroke thereby making part of the image bolder.

12. The accessory of claim 11 further comprising: a stored set of reference characters; and character recognition means executable by the processor for determining whether the scaled two-dimensional image substantially matches a character contained in the stored set of reference characters.

13. The accessory of claim 11 wherein motion having a component in a third-dimension along the longitudinal axis of the elongated accessory is ignored.

14. The accessory of claim 11 wherein motion having a component in a third-dimension along the longitudinal axis of the elongated accessory is representative of non-character input.

15. The acessory of claim 14 wherein non-character input can include any of a space, a carriage return, or an end of character delineation.

16. The accessory of claim 11, wherein a first double clicking of the motion selector button actuates the motion sensor and indicates the begining of a free-form input session.

17. The accessory of claim 16 wherein free-form input being captured between at least one of single clicks of the motion selector button or while the motion selector button is held down.

18. The accessory of claim 17 wherein the free-form input session ending upon a second double clicking of the motion selector button.

19. The accessory of claim 11 wherein the motion sensor is comprised of an accelerometer.

20. The accessory of claim 11 wherein the motion sensor is comprised of a gyroscopic device.

21. An elongated accessory for a mobile device that can detect and track motion and forward motion data to the mobile device for further processing via a direct cable connection between the mobile device and the accessory, the accessory comprising:

a motion sensor contained within the accessory and coupled with a processor in the mobile device via the cable connection, the motion sensor capable of detecting, tracking, and capturing motion in a two-dimensional plane; and a motion selector button disposed on the housing of the accessory and coupled with the processor in the mobile device via the cable connection, the motion selector button for actuating and de-actuating the motion sensor such that motion is only detected and motion data forwarded to the processor in the mobile device only while the motion selector button is actuated, wherein the processor determines the two-dimensional plane of motion tracked by the motion sensor to be perpendicular to the longitudinal axis of the elongated accessory and the processor continuously re-determines the two-dimensional plane of motion tracked by the motion sensor to adjust for unintended subtle changes in the orientation of the accessory, detecting a rapid change in the orientation of the longitudinal axis of the elongated accessory caused by an intentional tilting motion manipulating the scaled two-dimensional image by changing the default width of a line stroke thereby making part of the image bolder.

22. The accessory of claim 21 wherein the motion sensor is comprised of an accelerometer.

23. The accessory of claim 21 wherein the motion sensor is comprised of a gyroscopic device.

* * * * *